United States Patent [19]

Gombrich et al.

[11] Patent Number: 4,628,313

[45] Date of Patent: Dec. 9, 1986

[54] APPARATUS AND METHOD FOR REMOTELY MONITORING A UTILITY METER BY USE OF A LIQUID CRYSTAL DISPLAY

[75] Inventors: Peter P. Gombrich, Minneapolis; Steven K. Case, St. Louis Park; Lawrence R. Konicek, Richfield, all of Minn.

[73] Assignee: TeleMeter Corporation, Minneapolis, Minn.

[21] Appl. No.: 649,912

[22] Filed: Sep. 12, 1984

[51] Int. Cl.[4] ............................................. G08C 17/00
[52] U.S. Cl. ........................ 340/870.02; 250/231 SE; 340/688
[58] Field of Search ...................... 340/870.02, 870.03, 340/688, 671, 672; 250/231 SE; 324/153

[56] References Cited

U.S. PATENT DOCUMENTS

| 3,006,712 | 10/1961 | Eichacker ............................. 346/14 |
| 3,054,095 | 9/1962 | Heller . |
| 3,197,752 | 7/1965 | Rabinow ....................... 340/870.02 |
| 3,214,766 | 7/1963 | Baker et al. ............................ 346/95 |
| 3,266,018 | 8/1966 | Higgins ...................... 340/870.02 X |
| 3,307,164 | 5/1961 | Zimmer . |
| 3,500,365 | 10/1965 | Cain . |
| 3,503,044 | 12/1966 | Bonyhard et al. . |
| 3,503,061 | 3/1970 | Bray et al. ....................... 340/870.07 |
| 3,508,003 | 4/1970 | Moyers ..................... 340/870.02 X |
| 3,706,086 | 12/1972 | Farnsworth . |
| 3,842,208 | 10/1974 | Paraskevakos ..................... 179/5 R |
| 3,842,268 | 10/1974 | Cornell ......................... 250/231 SE |
| 3,845,377 | 10/1974 | Shimotori ............................ 318/662 |
| 3,846,788 | 11/1974 | Calabro et al. .................. 340/347 P |
| 3,852,726 | 12/1974 | Romanelli . |
| 3,922,490 | 11/1975 | Pettis .......................... 340/870.07 X |
| 4,007,454 | 2/1977 | Cain et al. .................. 340/870.07 X |
| 4,037,219 | 7/1977 | Lewis . |
| 4,041,483 | 8/1977 | Groff . |
| 4,086,434 | 4/1978 | Bocchi ............................. 179/2 AM |
| 4,104,486 | 8/1978 | Martin et al. ..................... 179/2 AM |
| 4,137,451 | 1/1979 | Einolf, Jr. ...................... 250/231 SE |
| 4,138,608 | 2/1979 | Brugger et al. ................ 235/92 FL |
| 4,227,148 | 10/1980 | Smith ................................. 324/115 |
| 4,241,237 | 12/1980 | Paraskevakos et al. ........ 179/2 AM |
| 4,327,362 | 4/1982 | Hoss ............................... 340/870.02 |

FOREIGN PATENT DOCUMENTS

2099260  5/1982  United Kingdom .

Primary Examiner—Jerry W. Myracle
Attorney, Agent, or Firm—Merchant, Gould, Edell, Welter & Schmidt

[57] ABSTRACT

The present invention relates to an optical sensor apparatus (21) for use in a remote meter monitoring system (20) for remotely monitoring the dials (34) of a utility meter or the like by use of a liquid crystal display (31). The liquid crystal display (31) includes five distinct areas 71 through 75 arranged in a semicircle in register with the circumferential path of a dial pointer arrangement (36) of the meter which including a dial pointer (37) and a disk like member (38) having a light absorptive semicircular portion (38a) and a reflective semicircular portion (38b). A sixth distinct area (76) being positioned in a diametrically opposed semicircle. The disk like member (38) being illuminated by a light emitting diode (40). The sixth distinct areas (71 through 76) being sequentially switched to a transparent condition and a readout of the light passing therethrough being obtained from a photodiode detector (42) so as to ascertain the angular position of the dial pointer arrangement (36) and thus obtain a readout thereof.

9 Claims, 16 Drawing Figures

APPARATUS AND METHOD FOR REMOTELY MONITORING A UTILITY METER BY USE OF A LIQUID CRYSTAL DISPLAY

BACKGROUND OF THE INVENTION

The present invention relates generally to an apparatus and method for remotely monitoring a utility meter or the like and transmitting the readout therefrom to a central location. More particularly, the present invention relates to an optical sensor apparatus and method for remotely monitoring a utility meter by use of a liquid crystal display.

Electric, gas, water or similar meters, are typically characterized by a plurality of rotatable shafts which are so interrelated that successive shafts are angularly displaced on a 10 to 1 basis with respect to its neighbor, whereby a direct decimal readout of the meter is enabled, by means of indicator pointers which rotate with the several shafts about dials on a face plate. In a typical power utility installation, for example, periodic reading of the meter is conducted by an individual who inspects the readings at each of the plurality of dials associated with the several shafts of the multistage meter, and thereby may record a direct decimal value.

Within recent years a considerable amount of interest has been generated in automating the readout function of the multistage or "polydecade" meter, as generally described above. Among the reasons that may be cited for such interest is a desire to reduce the cost of manual servicing, and the fact that the meters sought to be read are often in relatively inaccessible places in homes, and in factories and other installations. Moreover, interest is largely centered in providing an automated readout in such a form that said readout may be directly transmitted as for example by conventional transmission lines to the utility company or other provider of the services recorded on the meter. Such a result would not only vastly increase the efficiency and speed with which the meter readout process may be available to suppliers, but moreover provides as desired a virtually continuous capability for obtaining such information.

There has been considerable effort expended in providing means and apparatus for reading meters at a distance, for example, through telephone lines and the like. Most of such previous meter readings have required that some internal mechanical or electrical alternation be made to the meter itself, and considerable time and expense is required in putting the altered meter into use. In addition, when such alteration is performed there is the possibility of voiding the meter manufacturer's warranty. Many previous meter reading devices utilize sliding electrical contacts which has prevented their use in explosive atmospheres. Furthermore, in many such metering devices, changes in the output signal have been noted due to the aging of the components which can change the mechanical and or electrical characteristics.

Other meter reading devices have used photoelectric cells, so that no mechanical connection is needed between the meter and the meter readout. However, these reading devices have not been satisfactory because a reliable source of light must be provided and the face of the photoelectric cell must be kept sufficiently clean so that the light impinging on the photoelectric cell will not be diminished sufficiently to give a false reading.

Furthermore, the data from these systems and many other systems is extremely volatile as they monitor the disk or rotor movement of the meter. Accordingly, any slight disruption or interruption in the monitoring process will result in a complete data loss requiring that the meter be inspected manually to obtain a new start-up reading.

The present invention solves these and many other problems associated with many remote meter monitoring devices.

SUMMARY OF THE INVENTION

The present invention relates to an optical sensor apparatus for sensing the angular position of a pointer member fixedly mounted on a rotatable shaft for rotational movement therewith as the shaft rotates about an axis of rotation. The sensor apparatus includes a follower member fixedly interconnected to the rotatable shaft for rotation about the axis of rotation with the pointer member, the follower member and the pointer member having a circumferential path of travel. The follower member further having a first and second axially, oppositely facing sides, a first portion of the first side being generally reflective for reflecting light in a forward direction, and a second portion of the first side being generally absorptive. Light emitting means is positioned forward of the follower member for emitting light in a backward direction towards the first side of the follower member. Light detecting means is positioned forward of the follower member for detecting light reflected off of the follower member in a forward direction. Liquid crystal display means is positioned forward of the follower member between the follower member and the light detecting means. The liquid crystal display means defines six distinct areas disposed about the circumferential path of the follower member and a background area encompassing the remaining area of the circumferential path. Control means is provided for switching the six distinct areas and the background area between an opaque state and a transparent state. The control means further provides for switching all of the six distinct areas and the background area to the opaque state and then selectively switching each of the distinct areas one at a time to the transparent state while the remaining five areas and the background area are switched to the opaque state. Means is operatively interconnected to the light detection means for monitoring the light detection means and obtaining input signals therefrom so as to obtain a readout of the angular position of the pointer member.

The present invention enables the meter to be read manually when not actively taking a reading of the meter. The liquid crystal display of the present invention is switched off when the meter is not being read such that the liquid crystal display is transparent enabling easy reading of the meter dial pointers.

The present invention is particularly suited to being retrofitted on existing meters with minimum mechanical and electrical alteration. In the preferred embodiment, the standard meter dial pointer is replaced by a dial pointer with a disk, one half of which is reflective and one half of which is absorptive. In the preferred embodiment, the elements of the present invention are constructed and arranged so as to enable attachment to the meter face plate generally under the meter glass cover.

The present invention is particularly advantageous as it provides for non-volatile monitoring of the meter. Most systems monitor the continuously moving rotor of the meter and are accordingly very volatile since if the monitoring process is interrupted and data lost, then the meter must be manually read so as to provide a start-up figure or reading. The present invention converts the analog information of the rotating meter dials to digital information for transmission to a central site. Accordingly, if data is lost for whatever reason, another reading can be taken on demand or as required.

Yet another advantage of the present invention is its use of relatively low cost components. The cost to retrofit existing meters is minimal.

In addition, the present invention utilizes largely proven technology which has a high reliability. The various parts of the present invention have a relatively long life time, many of the parts being sheltered from the weather by the meter glass cover and further being weather resistant.

The present invention minimizes the wiring and electrical installation required at each site. The preferred embodiment utilizes the power lines already present at the meter location as its power source.

The preferred embodiment of the present invention includes a liquid crystal display which has a mask for each of the meter dials. The mask has five distinct areas arranged in a semicircle around the circumferential path of travel of the meter dial pointer. A sixth area is positioned in a diametrically opposed semicircle at a location along the circumferential path travel of the meter dial pointer. Accordingly, at any given time at least one of the six areas will be aligned with a semicircular reflective portion of the disk follower, and at least one of the six areas will be aligned with a semicircular absorptive portion of the disk follower member. Accordingly, this embodiment provides for continuous calibration of the system to assure accuracy even in varying light conditions or changes in the system's sensitivity with time.

Additionally, in the preferred embodiment transparent leads are used to connect the six areas of the liquid crystal display to suitable contacts such as connector pins at the edge of the liquid crystal display. This further enhances the accuracy of the present invention and allows unobstructive viewing of the dials for manual reading purposes.

The present invention will further provide operability at a wide range of temperatures and environmental conditions.

These and various other advantages and features of novelty which characterize the invention are pointed out with particularity in the claims annexed hereto and forming a part hereof. However, for a better understanding of the invention, its advantages and objects attained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

DETAILED DESCRIPTION OF THE PREFERRED EMBODIMENT

Figure 1:
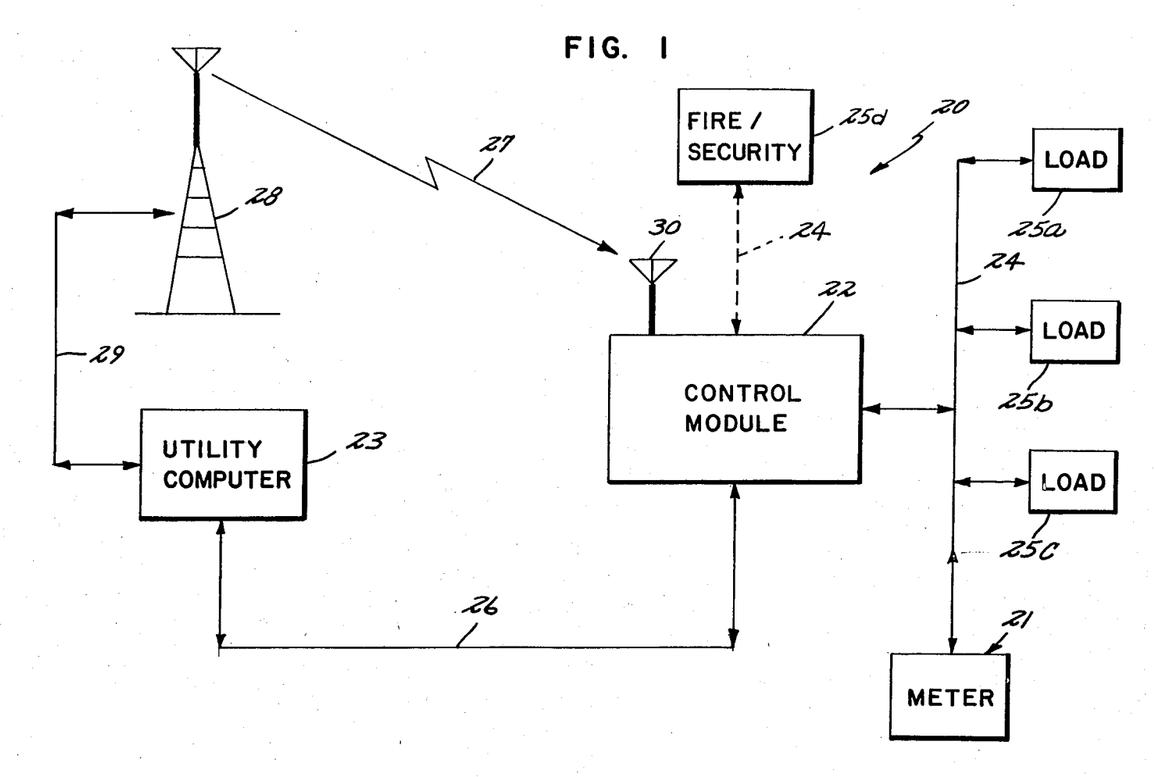
FIG. 1 is a block diagram of an embodiment of a remote meter monitoring system utilizing a liquid crystal display in accordance with the principles of the present invention.

Referring now to FIG. 1 of the drawings, a block diagram of an embodiment of a remote utility meter monitoring system utilizing a liquid crystal display in accordance with the principles of the present invention is disclosed, the system being generally designated by the reference numeral 20. The monitoring system 20 shown includes three major elements or subsystems; an optical sensor apparatus, generally designated by the reference numeral 21, which is mounted over the dials of an existing or newly installed meter for monitoring the movement of the dial pointers of a typical multistage meter, a control module, generally designated by the reference numeral 22, which is typically located inside the home or building where the meter is located and provides communication control between the optical sensor apparatus 21 and the utility company's computer, generally designated by the reference numeral 23, which forms the third major element of the system. In the embodiment shown, the control module 22 communicates over existing wiring 24 to the optical sensor apparatus 21 although this might be accomplished over specially installed cable, etc. As illustrated, the control module 22 might also provide communication to and control of, via the power lines 24, other utility devices 25a,b,c such as a fire/security system 25d. Two-way communication between the control module 22 and the utility company computer 23 is via existing telephone lines 26. An optional approach is to transfer data under-/over voice transmission. As further illustrated, an alternate method of communication is via a one-way RF link 27. An FM broadcasting structure 28 or mobile land stations interconnected to the utility company's computer 23 by conventional telephone lines 29 or dedicated lines providing for two-way communication, might be used to broadcast control signals to a receiver 30 at the control module 22 as required. The utility company's computer 23 might instruct the control module 22 to obtain meter readings on a periodic or demand basis as required. In addition, the control module 22 might be programmed to periodically obtain the meter readings and provide such information to the utility computer 23. The utility computer system 23 might include a front end system for communicating with the control module 22 and obtaining the readout information. The front end system might then at a later time download the meter reading data into the main utility company's computer. For example, a front end system might include a micro computer, such as an IBM PC, a modem, such as a HAYES SMARTMODEM, appropriate software, and supporting peripherals and communications lines. Of course, it will be appreciated that the meter reading data may be obtained by several different methods utilizing the principles of the present invention.

Figure 2:
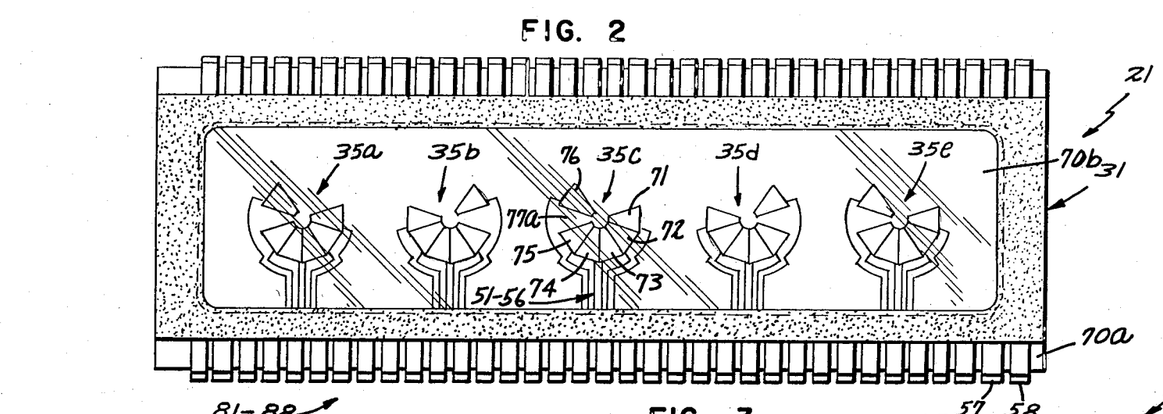
FIG. 2 is an elevational view of an embodiment of a liquid crystal display, minus its associated light emitting diodes and photodiode detectors, in accordance with the principles of the present invention.
Figure 3:
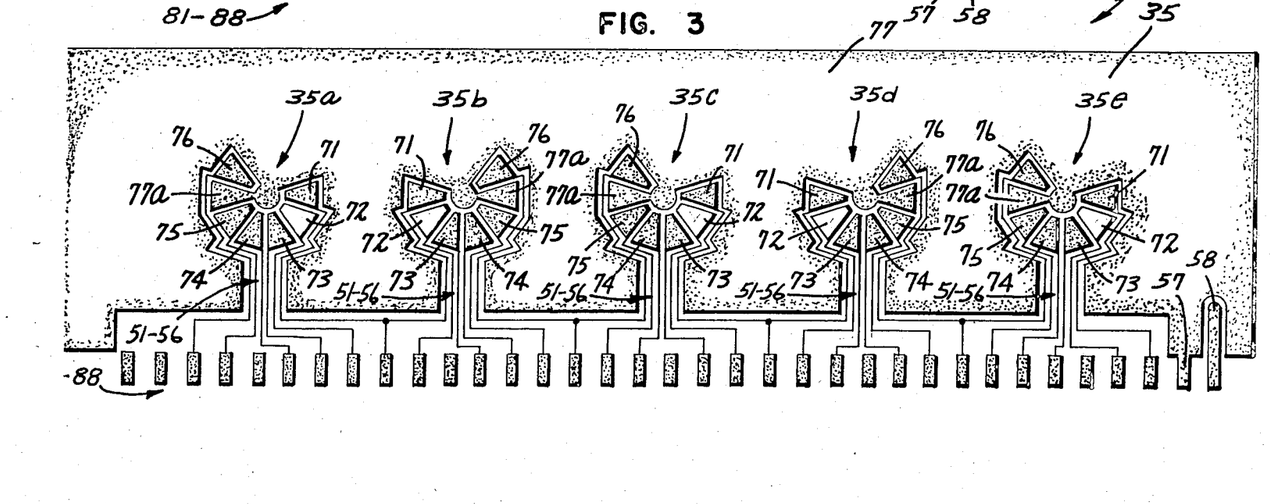
FIG. 3 is an elevational view of the mask of the liquid crystal display shown in FIG. 2.
Figure 4:
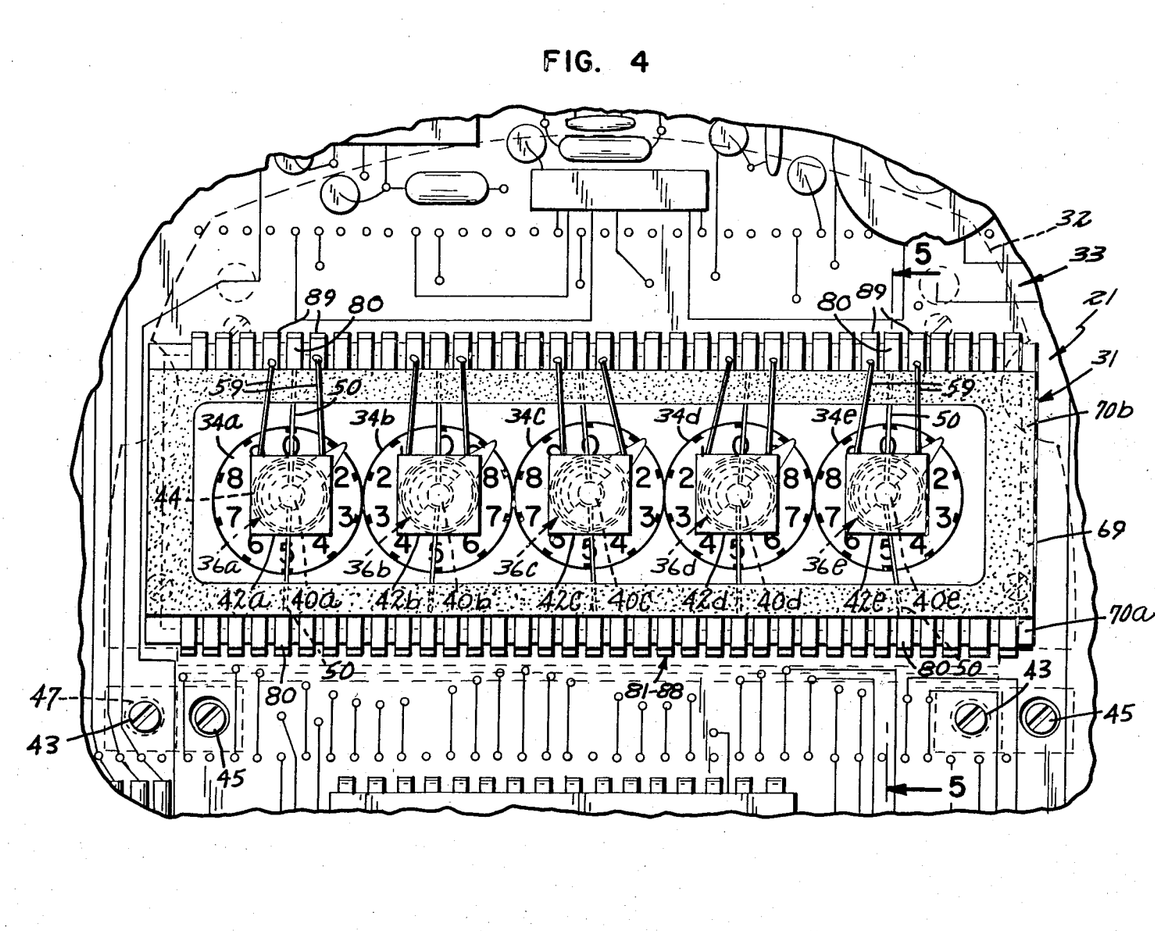
FIG. 4 is a fragmentary elevational view of the liquid crystal display shown in FIG. 2 mounted on the front plate of a meter under the glass cover of the meter.
Figure 5:
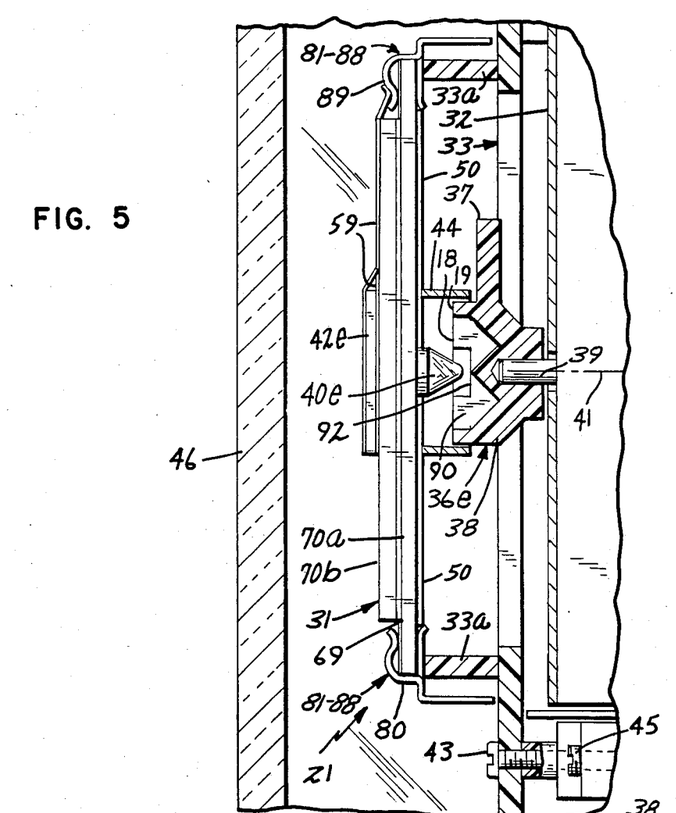
FIG. 5 is a sectional view, with portions shown in elevation, as seen generally along line 5—5 of FIG. 4.
Figure 6:
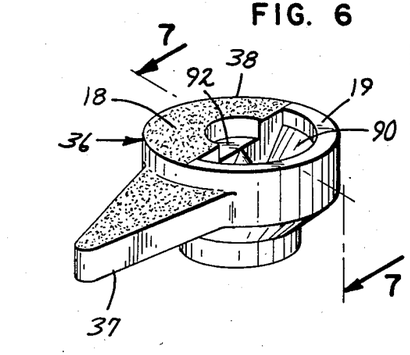
FIG. 6 is a view in perspective of an embodiment of a dial pointer an its associated disk follower member in accordance with the principles of the present invention.

As illustrated in FIGS. 2 through 5, the optical sensor apparatus 21 includes a liquid crystal display 31. The liquid crystal display 31 is suitably mounted onto a utility meter face plate 32 by a printed circuit board structure 33 as generally illustrated in FIGS. 4 and 5. The printed circuit board 33 might be attached by threaded fasteners 43 to the face plate 32 to enable easy removal and attachment thereof. The threaded fasteners 43 will preferably be configured and arranged on the printed circuit board 33 to enable use of existing threaded apertures in the meter face plate 32 such that the meter face plate 32 need not be modified. Spacers 47 might be positioned between the printed circuit board 33 and the face plate 32 to maintain a proper spacing. Appropriate openings are provided in the printed circuit board 33 for existing meter adjustment screws 45. As illustrated, the printed circuit board may also have mounted thereon the supporting electronics. Mechanical standoffs 33a might be utilized to position the liquid crystal display 31 on the printed circuitboard 33. The liquid crystal display 31 extends across all five dials or stages 34a-e of a typical multi-stage utility meter and includes a mask 35 having a separate mask portion 35a-e associated with each of the meter dials 34a-e. As further illustrated in FIGS. 5 through 7, in the preferred embodiment of the present invention, the conventional meter dial pointers are each replaced with a one-piece dial pointer arrangement 36 including a radially extending pointer 37 attached to the periphery of a cylindrical disk-like member 28. The cylindrical disk-like member 38 is suitably secured to the existing meter dial shaft 39 for rotation therewith, there being a separate shaft associated with each dial pointer arrangement 36a-e. The side of the disk-like member 38 facing te liquid crystal display 31 is generally divided into two semi-circular portions 18, 19. The semi-circular portion 18 is largely absorptive of light while the semi-circular portion 19 is largely reflective. Positioned in front of each of the cylindrical disk-like members 38 is a light emitting diode 40a-e which is suitably interconnected to the liquid crystal display 31. The light emitting diodes 40a-e are preferably aligned with the axis of rotation 41 of their associated meter dial shafts 39. Positioned on the opposite side of the liquid crystal display 31, axially opposite each of the light emitting diodes 40a-e is a photo diode detector 42a-e. An axially projecting ambient light shroud member 44 might be interconnected to the liquid crystal display 31 so as to reduce the interference of ambient light with the meter monitoring process, there being one light shroud member 44 for each disk-like member 38. The light shroud member 44 will preferably extend generally about the circumference of the cylindrical disk-like member 38. The above-described liquid crystal display and associated parts are preferably configured and arranged so as to enable clearance for the glass cover 46 of the meter.

Figure 13:
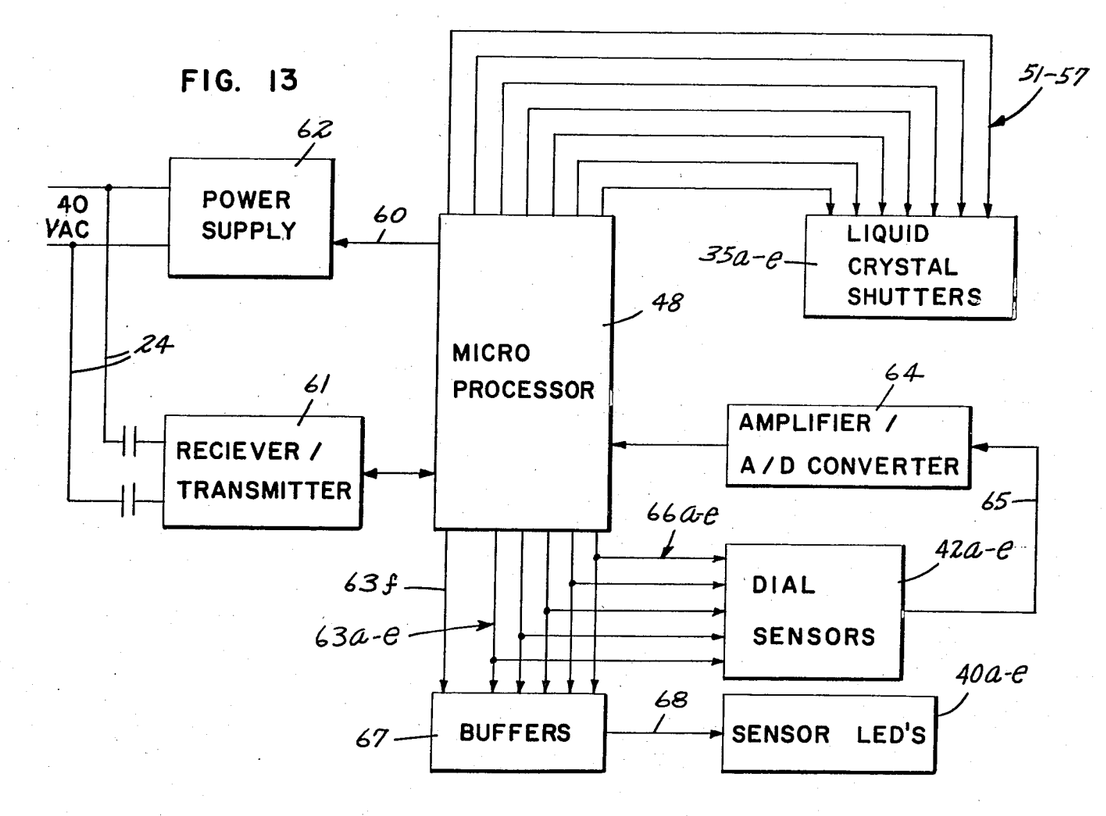
FIG. 13 is a block diagram of an embodiment of control electronics for a liquid crystal display in accordance with the principles of the present invention.

As further illustrated in FIG. 13, an embodiment the optical sensor apparatus 21 includes a microprocessor 48 electrically interconnected via suitable leads 51–57 to each of the masks or shutters 35a-e of the liquid crystal display 31 to enable control thereof. In addition, the microprocessor is suitably interconnected via leads 60 to the conventional 240 volt AC power supply of the meter, generally designated by reference numeral 62. The microprocessor 48 will include receiver/transmitter circuitry 61 for transmitting the meter readout data and clock information on the electrical lines 24. The microprocessor 48 is interconnected by leads 63a-f to a buffer 67 for transferring control signals to the light emitting diodes (LEDs) 40i a-e via interconnect 68. The microprocessor 48 will transmit signals via leads 66a-e to the photo diode detector(s) or dial sensors 42a-e so as to obtain a read-out of each of the dials 34a-e of the meter. As illustrated, the signal from the photodiode detector(s) 42a-e will be sent back through amplifier A-D converter circuitry 64 via electrical leads 65 to enable amplification and conversion of the analog signal to a digital signal. Leads 63a-e and 66a-e are interconnected such that by setting any one of the leads 63a-e high, the corresponding photodiode detector 42a-e and light emitting diode 40a-e will both be enabled.

Figure 14:
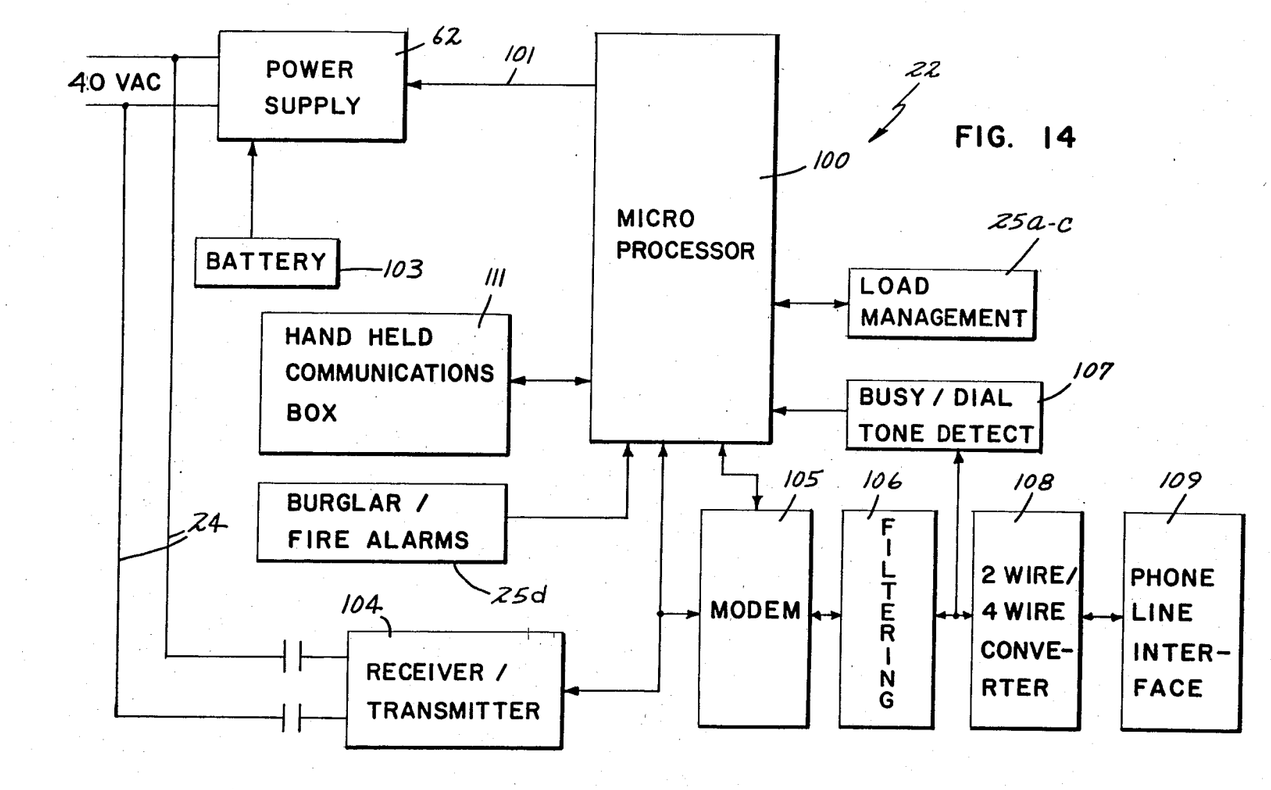
FIG. 14 is a block diagram of an embodiment of a control module of a remote meter monitoring system utilizing a liquid crystal display in accordance with the principles of the present invention.

Illustrated in FIG. 14 is an embodiment of the control module 22 of the remote utility meter monitoring system 20 shown in FIG. 1. The control module might include a microprocessor 100 interconnected by wiring 101 to the conventional 240 volt AC power supply 62. The power supply 62 might be backed up by a battery 103. The microprocessor 100 might communicate via the existing wiring 24 with the optical sensor apparatus 21 by use of receiver/transmitter circuitry 104. As illustrated, the control module 22 might include a modem 105 with appropriate filtering circuitry 106, busy/dial tone detect circuitry 107, converter circuitry 108, and telephone line interface circuitry 109 to enable connection with the utility computer 23. It will be appreciated, that these elements are off the shelf items and that indeed various configurations and arrangements might be utilized for controlling the optical sensor apparatus 21 and communicating with the utility computer 23. As previously mentioned, the control module 22 shown in FIG. 14, might be interconnected to other utility devices 25a-c to provide load management for regulating the utility load at the remote cite. In addition, a hand held communications box 111 might be provided to enable a person at the remote site to obtain a reading or test the sensor apparatus 21. Further, as previously indicated, the microprocessor 100 might be interconnected to other sensors or detectors such as burglar or fire alarms 25d.

More particularly, the liquid crystal display 31 of the optical sensor apparatus as illustrated in FIGS. 2 through 4, includes a front plane member 70a and a back plane member 70b which are adhesively interconnected by conventional methods generally about a boarder area 69. The liquid crystal display 31 is mounted on the printed circuit board 33 so as to enclose a rectangular opening in register with the five dials 34a–e so as to be aligned with all five of the dials or stages 34a–e of a typical meter. The front plane will include the five masks 35a–e which are generally axially aligned with the dial pointer arrangements 36a–e. Each of the masks 35a–e will define five distict wedge-shaped areas or segments 71, 72, 73, 74 and 75 arranged in a semi-circular configuration. Each of the masks will further include a sixth area or seqment 76 positioned in the diametrically opposed semi-circular portion of the mask. Each of the areas 71-76 will be interconnected via the leads 51-56, respectively, to the microprocessor 48. The remaining surface area or segment 77 of the front plane 66 will serve as a background area for the mask and will be interconnected via the lead 57 to the microprocessor. Preferably, the leads 51 through 57 on the liquid crystal display 22 will be transparent so as to not interefere with human readability. (See FIG. 3 for the arrangement of the mask area 35a–e in the preferred embodiment.) Preferably, the area 76 will be separated from the closest adjacent area 75 by a background area 77a having a configuration similar to that of the areas 71 through 76. In addition, the wedge-shaped areas 71 through 76 will preferably extend radially so as to have an outside diameter which is slightly less than the dial pointer arrangement 36 as is diagrammatically illustrated in FIGS. 8 through 11. The segments 71 through 76 are disposed between adjacent numerals on the dials 34a–e and are slightly spaced apart from one another. The back plane 70b of the liquid crystal display 22 is interconnected to the microprocessor 48 by a lead 58 via a conductive extension or dot interconnecting the front plane 70a to the back plan 70b. The leads 51 through 58 are interconnected to corresponding dual in line pins (DIP) 81 through 88 epoxied onto the edge of the liquid crystal display 31, which make contact with the enlarged areas of the corresponding leads 51-58 at the periphery of the liquid crystal display 31.

Figures 8, 9, 10, 11, 12:
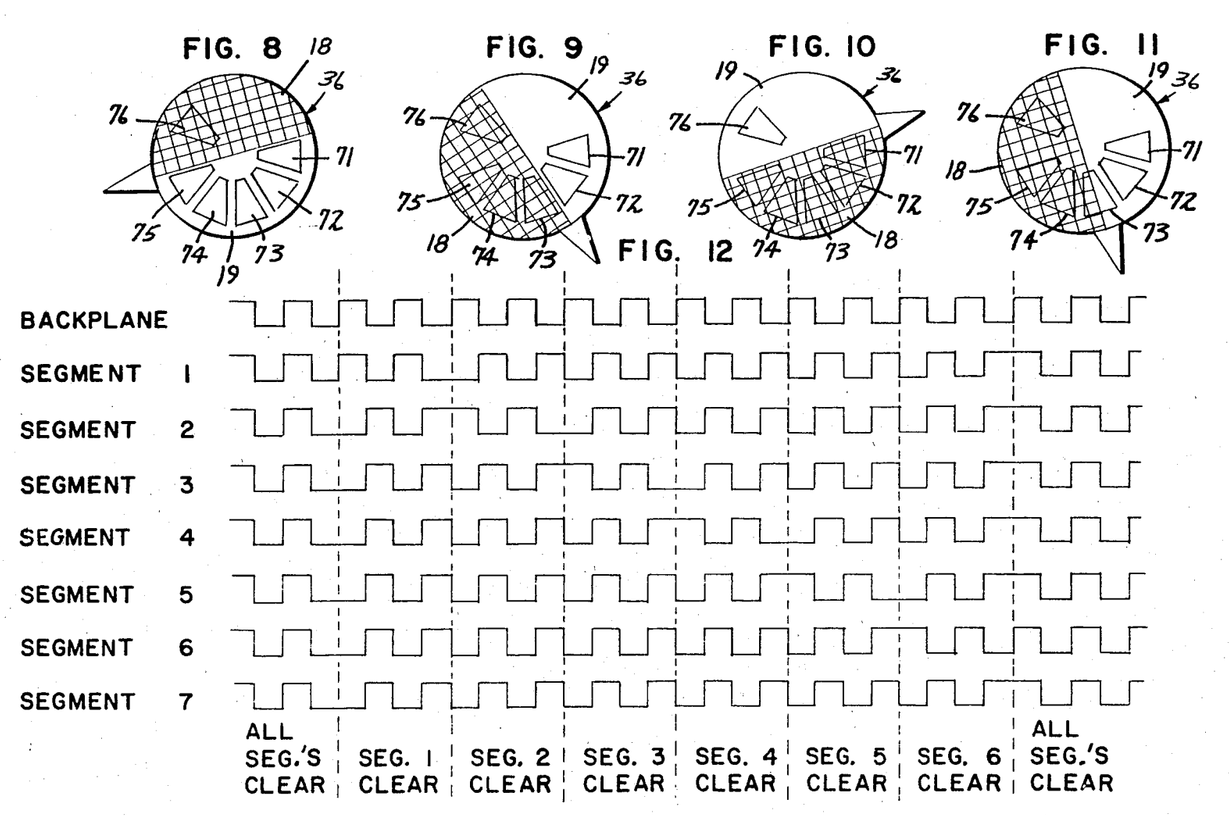
FIGS. 8 through 11 are diagramatic views illustrating varying positions of the dial pointer and its associated disk follower member relative to the liquid crystal display mask.
FIG. 12 is a timing diagram for each of the six distinct areas, the background area, and the back plane of the liquid crystal display.

Preferably, the liquid crystal display 31 includes polarizers on the front plane 70a and the back plane 70b which afford a clear display when no drive voltage is applied to the planes 70a and 70b. The liquid crystal display 31 is used in a transmissive mode so as to shutter light reflected from the cylindrical disk-like member 38 of the dial pointer arrangement 36 by successively switching the areas 71-76 to a clear or transparent state from an opaque or dark state. The background area 77 is darkened during this process to reduce ambient light. The areas 71 through 76 are wired in parallel for each of the masks 35a–e to reduce the wiring required. Accordingly, the same area 71 through 76 will be switched to the clear or transparent state for each of the masks 35a–e during the read process. The microprocessor 48 will then sequentially read the photodiode detectors 42a–e to obtain a reading of the angular position of each of the dial pointers 37a–e. For example, in FIG. 3, area 72 is illustrated as being switched to the clear or transparent state while the remaining areas 71 and 73-77 are switched to the dark or opaque state for each of the masks 35a–e. As illustrated in FIG. 12, this is accomplished by driving the area to be switched to the clear or transparent state out of phase from the remaining areas and in phase with the back plane 70b. In the preferred embodiment, the liquid crystal display 31 is made from nematic liquid crystals.

As diagrammatically illustrated in FIGS. 8 through 11, the arrangement of the areas 71 through 76 provide six discrete liquid crystal shutters, five of which are arranged in a half circle or semi-circular fashion and one which is positioned in the diametrically opposed semi-circle such that at least one of the areas 71 through 76 will be aligned with the absorptive semi-circular portion 18 of the cylindrical disk-like member 38 and one aligned with the reflective semi-circular portion 19 of the cylindrical disk-like member 38. Accordingly, upon being sequentially switched to the clear or transparent state, at least one of the areas 71 through 76 for each of the dials 34a–e will provide a high signal and one will provide a low signal. This will enable continuous calibration of the sensor electronics. For example, in FIG. 8, the area 76 will provide a low reading while in FIG. 10, the area 76 will provide the only high reading. In FIG. 9, areas 73 through 76 will provide a low reading while areas 71 through 72 will provide a high reading. In FIG. 11, the areas 71 through 72 will provide a high reading, and the areas 74 through 76 will provide a low reading, while the area 73 will provide a mixed reading.

As illustrated in FIG. 4, there is a separate detector 42a–e for each of the masks 35a–e. The detectors 42a–e are large enough so as to cover or shield each of the areas 71 through 76; that is, the detectors 42a–e have a radius greater than that of the areas 71-76 of the masks 35a –e. It will be appreciated that while the detectors 42a–e are shown as having a rectangular configuration, alternative configurations might be utilized. Further, a separate detector for each segment 71-76 might be utilized; however, the use of a single detector requires just two thin leads 59 to interconnect the detector 42 to its corresponding dual in line pins 89. In addition, the light emitting diodes 40a–e which are positioned between the masks 35a–e and the dial pointer arrangements 36a–e are interconnected by two leads 50 to corresponding dual in-line pins 80. As illustrated in FIG. 4, the respective pointers 32 of the dial pointer arrangements 36 extend beyond the periphery of the detectors 42a–e and the meter dial numberings also lie outside the periphery of the detectors 42a–e such that the meter can be manually read when the monitorig system of the present invention is not actively taking a reading.

Figure 7:
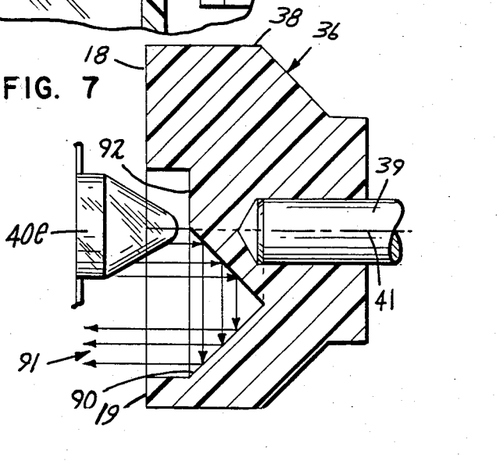
FIG. 7 is a sectional view as seen generally along line 7—7 in FIG. 6.

As illustrated in FIGS. 5 and 7, the light emitting diode 40 is mounted axially in front of the cylindrical disk-like member 38 of the dial pointer arrangement 36. In the preferred embodiment, the semi-circular portion 19 has an inverted concial depression 90 whose side walls are at a 45 degree angle such that light from the light emitting diode 40 is reflected in collimated form back toward the photodiode detector 42 as illustrated by the arrows 91. The absorptive semi-circular portion 18 reflects very little light. In the preferred embodiment, the light emitting diode 40 is positioned in a depression 92 at the center of the cylindrical disk-like member 38. Preferably, the dial pointer 37 has an absorptive surface so as to not reflect any light. It will be appreciated that other configurations of the member 38 might be utilized such as a concave mirror reflector, in keeping with the principles of the present invention.

The optical sensor apparatus 21 of the present invention will be mounted over the existing five dials 34a–e of a typical multistage utility meter. The optical sensor apparatus 21 will enable both machine readability and human readability. Typically, the liquid cystal display 31 and its support structure 33 have a thickness of less than ⅜ inch so as to fit under the existing meter glass cover 46. In addition, the electronics, including the microprocessor 48 will typically be mounted under the meter cover 46. In some meters, the space available under the existing glass cover 46 will be insufficient to house the electronics. This will be especially true if telecommunications and a separate power supply are housed within the meter. If an extended cover is used, the constraints on the sensor assembly thickness will be relaxed.

The optical sensor apparatus will not make mechanical or electrical contact with any moving parts within the meter, with the exception that the existing pointer will be replaced by the dial pointer assembly 36. Components of the optical sensor system 21 may be chosen to provide for a life time of several years. In addition, the sensor assembly will be capable of operating from −40 C to +80 C. Typically, the sensor assembly will be installed in a utility service shop and the installation of such will not require the meter to be recalibrated.

In operation, the corresponding light emitting diodes 40a-e and photodiode detectors 42a-e for the dial 34a-e being read will be enabled by setting the corresponding lead 63a-e high. The light from the light emitting diode 40 will reflect from the reflective portion 19 of the cylindrical disk-like member 38 and return in the direction of the mask 35 as a collimated beam. The reflected light will pass through the mask 35 of the liquid crystal display 31. During the sensing or reading process, only one of the areas or segments 71 through 76 is made transparent by driving its corresponding line 51-56 in phase with the back plane 70b so as to allow the detector 42 to sense only light being returned from a specific portion of the cylindrical disk-like member 38. This portion will be equivalent to one decimal digit position about the circumference of the meter dial. The areas 71 through 76 will be opened successively to enable viewing sequentially about the disk like member 38. As previously mentioned, the areas 71 through 76 of each mask 35a-e for each of the meter dials 34a-e will be driven in parallel to minimize wiring and multiplexing requirements; that is, the same area or segment 71 through 76 will be open simultaneously for all the meter dials 34a-e. However, the light emitting diodes 40a-e and photodiode detectors 42a-e will be activated one at a time for the particular dial being read. Not only does this minimize wiring and multiplexing, but typically there must be a delay of about six seconds after one of the segments 71-76 has been selected before a detector reading can be taken. The detector elements 42a-e will preferably be wired in parallel. Steering diodes will allow only one detector associated with the dial being illuminated to be read at one time by the A/D converter circuitry 64. It will be appreciated that the optical sensor apparatus 21 might be wired with other configurations whereby the sequence of events will vary.

Figure 15A:
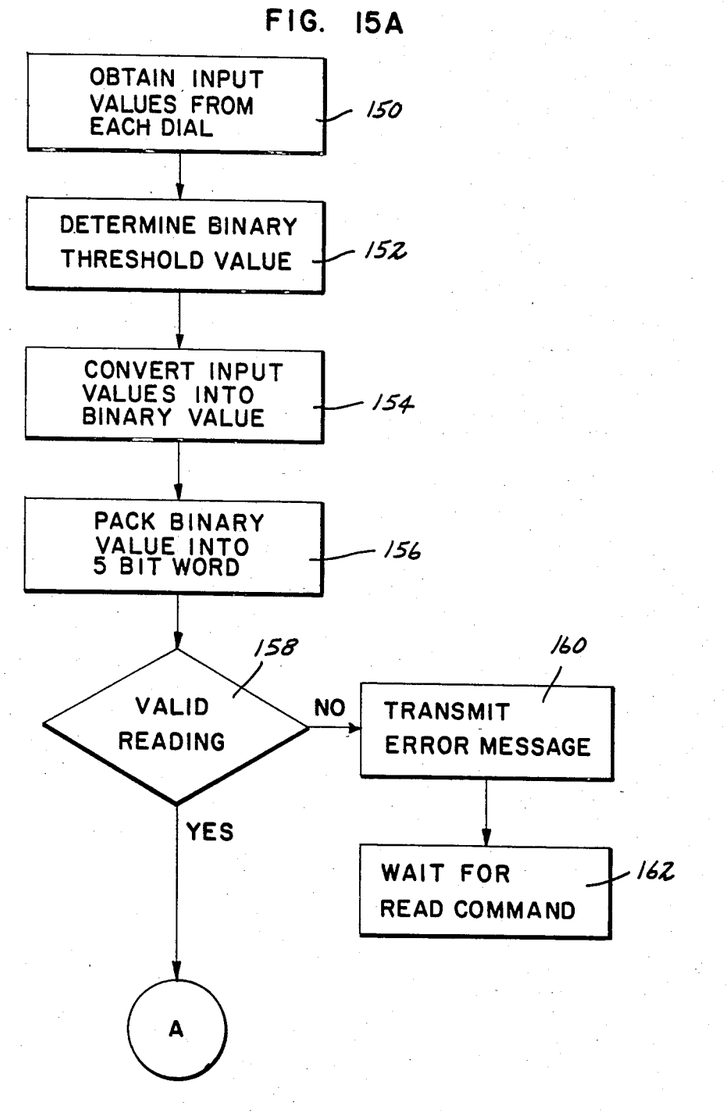
FIGS. 15A and 15B are block diagrams of the logic utilized in one embodiment of the present invention for processing the input from the six distinct areas or segments of the liquid crystal display.
Figure 15B:
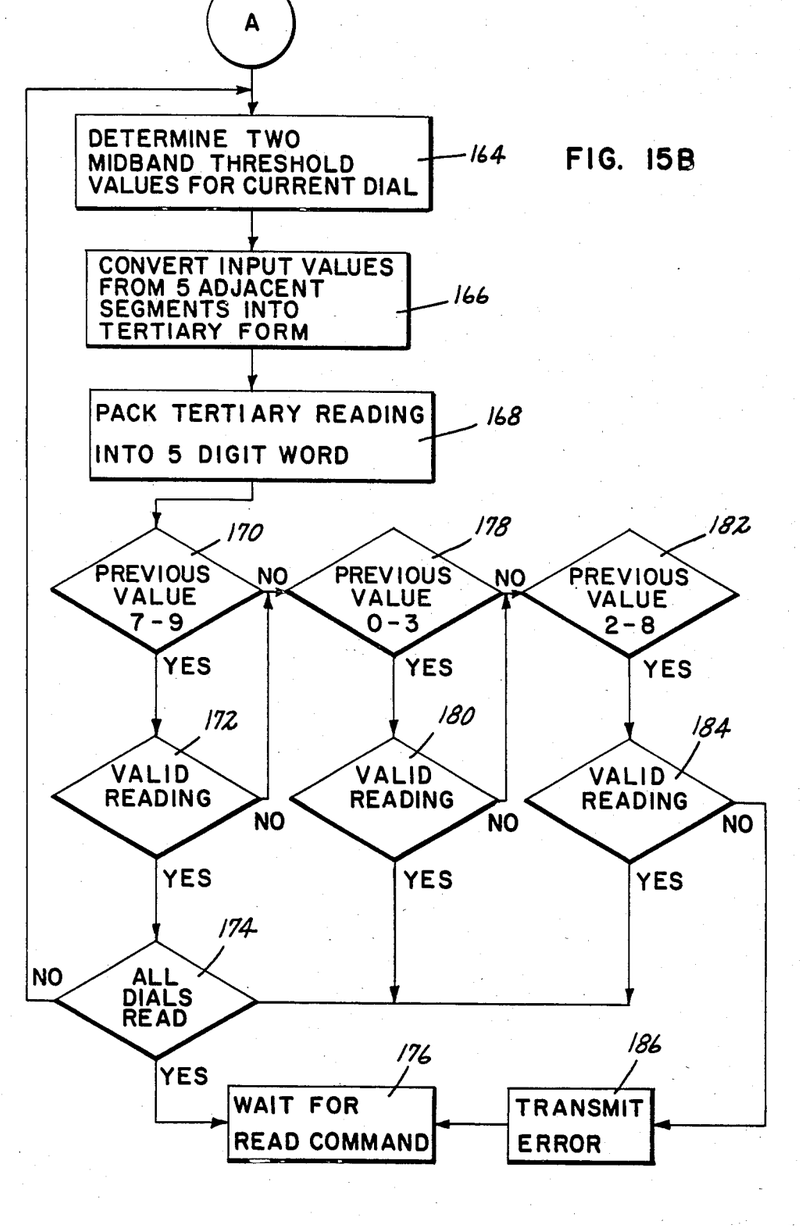

As illustrated in FIGS. 15A-B, once the six input values obtained from each of the photodiode detectors 42a-e have been obtained by the microprocessor 48, the six values being representative of the amount of light detected by the photodiodes as each of the six segments 71 through 76 are sequentially opened or switched to the transparent state, the microprocessor will encode the values and ascertain whether a valid value has been received. After obtaining the input values from each dial at step 150, a binary threshold value at step 152 is computed for the dial representative of the least significant digit typically the one kilowatt dial. The binary threshold is calculated as follows:

$$THRESHOLD = MIN + \frac{MAX - MIN}{2}$$

WHERE MAX and MIN are the maximum and minimum, respectively, of the six digital levels from the 1 kilowatt dial.

At step 154 the input values for the five adjacent segments 71 through 75 are converted to binary form as follow:

1 = Level THRESHOLD

0 = Level THRESHOLD

At step 156 the binary data is packed into a five bit word where:
BIT 0 = Segment 75
BIT 1 = Segment 74
BIT 2 = Segment 73
BIT 3 = Segment 72
BIT 4 = Segment 71

At step 158 the value of the five bit binary word is compared with a preset table of values as follows:

| BITS | READING |
|---|---|
| 00000 | 2 |
| 00001 | 1 |
| 00011 | 0 |
| 00111 | 9 |
| 01111 | 8 |
| 11111 | 7 |
| 11110 | 6 |
| 11100 | 5 |
| 11000 | 4 |
| 10000 | 3 |

If the five bit binary word does not match any of the values in the table, at step 160 an error message is transmitted to the control module 22 and at step 162 the sensor apparatus 21 waits for further commands from the control module 22.

If the five bit binary word was found to be valid, then as indicated by the connector A and as further illustrated in FIG. 15B, at step 164 midband threshold values are determined for each of the six input values from the remaining dials. The midband thresholds are calculated as follows:

$$MID\ 1 = MIN + \tfrac{1}{3}(MAX - MIN)$$

$$MID\ 2 = MIN + \tfrac{2}{3}(MAX - MIN)$$

Where Max and Min are the maximum and the minimum, respectively, of the six digital levels.

At step 166 the input values from the five adjacent segments 71 through 75 are converted into tertiary form using the following digital thresholds:

| 0 Level | MID 1 |
|---|---|
| 1 MID 1 | Level ¢ MID 2 |
| 2 MID 2 | Level |

The digital word at step 168 is configured such that:
Digit 0 = Segment 75
Digit 1 = Segment 74
Digit 2 = Segment 73
Digit 3 = Segment 72

Digit 4=Segment 71

At step 170, a check is made as to whether the previous dial read 7 through 9. If the previous dial did read 7-9, at step 172 the five digit word is compared to a table of preset values as follows to ascertain whether or not a valid reading has been obtained:

| WORD  | READING |
|-------|---------|
| 00000 | 1       |
| 00002 | 0       |
| 00022 | 9       |
| 00222 | 8       |
| 02222 | 7       |
| 22222 | 6       |
| 22220 | 5       |
| 22200 | 4       |
| 22000 | 3       |
| 20000 | 2       |

If a match is found in the table, then at step 174 a check is made to ascertain whether all of the dials 34 have been read. If at step 174 it is determined that the dials have all been read, the processor at step 176 will wait for another read command from the control module 22. If there are more dials to be read, the midband threshold determination and conversion into tertiary form is repeated.

At step 170 the previous dial did not read 7 through 9 or if at step 172 no match was found, at step 178 a check is made to see if the previous dial read 0 through 3. If the previous dial did in fact read 0 through 3, at step 180 a comparison of the five digit word is made against the following table of preset values:

| WORD  | READING |
|-------|---------|
| 00000 | 2       |
| 00012 | 1       |
| 00122 | 0       |
| 01222 | 9       |
| 12222 | 8       |
| 22222 | 7       |
| 22220 | 6       |
| 22200 | 5       |
| 22000 | 4       |
| 20000 | 3       |

If a match is found at step 180, step 174 is then performed. If at step 178 the previous dial had not read 0 through 3 or if at step 180 a valid reading was not found, at step 182 a check is made as to whether the previous dial read 2 through 8. If the previous dial had read 2 through 8, then at step 184 the five digit word is compared to the following table of preset values:

| WORD  | READING |
|-------|---------|
| 10000 | 2       |
| 00001 | 1       |
| 00012 | 0       |
| 00122 | 9       |
| 01222 | 8       |
| 12222 | 7       |
| 22221 | 6       |
| 22210 | 5       |
| 22100 | 4       |
| 21000 | 3       |

If a match if found such that a valid reading is determined, then step 174 is performed. If a valid reading is not found, then at step 186 an error message is transmitted to the control module 22 and at step 176 the microprocessor 48 waits for further commands from the control module 22.

It will be appreciated that other methods for determining validity of the meter reading might be utilized.

The number and size of wires crossing the liquid crystal display 22 will be minimized so as to not obscure the dial for human reading. As illustrated in FIG. 3, some of the leads 51-57 will be shared by more than one mask 35a-e. To enhance the reliability and accuracy of the sensor assembly, as previously mentioned, the shroud members 44 may be utilized to shield against ambient light. In addition, the background area 77 of the liquid crystal display 31 will turn dark during the read operation to further reduce ambient light.

The configuration of the dark-like member 38 and the six segment mask configuration of the liquid crystal display 31 will enable the optical sensor apparatus 21 to be self-calibrating so as to compensate for changes in ambient light, detector leakage current, and light emitting diode output.

In certain applications, the optical sensor system 21 and other elements of the system will derive their power from the 240 volt AC power line to the meter. Communications with the control module 22 will also preferably be via the existing AC lines so as to minimize the requirement for additional wiring.

Even though numerous characteristics and advantages of the preferred embodiment of the invention have been set forth in the foregoing description, together with details of the structure and function of the invention, the disclosure is illustrative only, and changes may be made in detail, especially in matters of shape, size, and arrangement of parts, within the principle of the invention, to the full extent indicated by the broad general meaning of the terms in which the appended claims are expressed.

What is claimed is:

1. An apparatus for optically sensing the angular position of a pointer member fixedly mounted on a rotatable shaft for rotational movement therewith as the shaft rotates about an axis of rotation, said apparatus comprising:

(a) a follower member fixedly interconnected into the rotatable shaft for rotation about the axis of rotation with the pointer member, said follower member and said pointer having a circumferential path of travel, said follower member having first and second opposite sides facing in opposite axial directions, a first portion of said first side being generally reflective for reflecting light in a forward direction and a second portion being generally absorptive;

(b) light emitting means positioned forward of said following member for emitting light in a backward direction towards said first side of said follower member;

(c) light detecting means positioned forward of said follower member for detecting light reflected off of said follower member in a forward direction;

(d) liquid crystal display means positioned forward of said follower member, between said follower member and said light detecting means, said liquid crystal display means defining six distinct areas disposed about the circumferential path of the follower member and a background area encompassing the remaining area of said liquid crystal shutter means;

(e) control means for switching said six distinct areas and said background area between an opaque state and a transparent state, said control means further providing for switching all of said distinct areas and said background area to the opaque state and then selectively switching each of said distinct areas, one at a time, to the transparent state while the remaining five areas and the background area are switched to the opaque state; and (f) means operatively interconnected to said light detection means for monitoring said light detection means and obtaining input signals therefrom so as to obtain a read-out of the angular position of the pointer member.

2. An apparatus in accordance with claim 1, wherein said follower member includes a disk-like member, said disk-like member being circular in cross section transverse to the axis of rotation of the rotatable shaft, said reflective first portion occupying in cross section a first one half of said circular cross section, said absorptive second portion occupying in cross section a second one half of said circular cross section, five of said six areas of said liquid crystal shutter means being positioned in a first semi-circle about the axis of rotation, the sixth of said six areas being positioned outside of said first semi-circle.

3. An apparatus in accordance with claim 1, wherein when the apparatus is in an off condition and not actively monitoring the angular position of the pointer member, all of said six areas and said background area are switched to the transparent state to provide for human readability of the angular position of the pointer member.

4. A sensor apparatus for converting the decimal digits represented by the successive stages of a multi-stage meter into binary coded form for use by a microprocessor, each stage of said meter including a pointer member affixed for rotation about an axis of rotation with a rotatable shaft which is angularly displaced on a ten-to-one ratio with respect to the higher adjacent shaft so as to record decimal readings and measurements effectuated by said meter, said converter comprising:

(a) separate light transmitting means operatively connected and associated with each of the pointer members for following the angular displacement of each of the pointer members, said light transmitting means transmitting light in a forward direction axially away from each of the pointer members, said light transmitting means following a circumferential path about the axis of rotation;

(b) separate light detecting means operatively connected and associated with each of said light transmitting means for detecting light transmitted from each of said light transmitting means, said light detecting means being displaced axially in the forward direction away from each of said light transmitting means;

(c) liquid crystal display means associated with each of said light transmitting means for selectively limiting the passage of light from said light transmitting means, said liquid crystal display means being positioned between said light transmitting means and said light detecting means, said liquid crystal display means having separate and distinct areas positioned about the circumferential path followed by said light transmitting means and a background area occupying those areas of the circumferential path not occupied by any of said distinct areas;

(d) control means associated with said liquid crystal display means for selectively switching said distinct areas and said background area between an opaque state and a transparent state; and (e) monitoring means operatively interconnected to each of said light detecting means for monitoring each of said light detecting means and obtaining input signals therefrom indicative of the angular position of each of the respective pointer members.

5. An apparatus in accordance with claim 4, further including means for transmitting the angular position of each of said pointer members to a remote location.

6. An apparatus in accordance with claim 5, wherein said light transmitting means includes a disk-like object mounted for rotation about the axis of rotation with the pointer member, a light emitting source being displaced in the forward direction from the disk-like object, said light emitting source shining light toward the disk-like object, one half of the disk-like object being reflective and the other one half being absorptive.

7. An apparatus in accordance with claim 4, wherein said distinct areas of said liquid crystal display means include five distinct areas occupying a semi-circle which corresponds to a first one half of the circumferential path traveled by said light transmitting means, each of said five distinct areas corresponding to decimal digit positions about the circumferential path traveled by the pointer member, said light transmitting means having a circular cross section transverse to the axis of rotation, a first one half of said circular cross section transmitting light and a second one half of said circular cross section not transmitting light.

8. An apparatus in accordance with claim 6, wherein said liquid crystal display means includes a sixth distinct area occupying a portion of a second one half of the circumferential path traveled by said light transmitting means which is not occupied by the other five distinct areas, and accordingly at any given time at least one distinct area will be receiving light from the reflective half of said disk-like object and at least one distinct area will be lined with the absorptive one half of the disk-like object so as to not receive any or very little light.

9. An apparatus in accordance with claim 4, wherein said control means includes means for switching all of said distinct and said background area of said liquid crystal display to the opaque state and then selectively switching each of said distinct areas one at a time, to the transparent state while said other distinct areas and said background area are maintained in the opaque state.

* * * * *